United States Patent
Giladi

(10) Patent No.: US 9,015,477 B2
(45) Date of Patent: Apr. 21, 2015

(54) SYSTEM AND METHOD FOR SECURE ASYNCHRONOUS EVENT NOTIFICATION FOR ADAPTIVE STREAMING BASED ON ISO BASE MEDIA FILE FORMAT

(71) Applicant: FutureWei Technologies, Inc., Plano, TX (US)

(72) Inventor: Alexander Giladi, Princeton, NJ (US)

(73) Assignee: FutureWei Technologies, Inc., Plano, TX (US)

( * ) Notice: Subject to any disclaimer, the term of this patent is extended or adjusted under 35 U.S.C. 154(b) by 27 days.

(21) Appl. No.: 13/857,907

(22) Filed: Apr. 5, 2013

(65) Prior Publication Data

US 2013/0268761 A1    Oct. 10, 2013

Related U.S. Application Data

(60) Provisional application No. 61/620,810, filed on Apr. 5, 2012.

(51) Int. Cl.
  *H04L 29/06*  (2006.01)
  *G06F 21/00*  (2013.01)
  (Continued)

(52) U.S. Cl.
  CPC .............. *H04L 9/32* (2013.01); *H04L 63/0428* (2013.01); *H04L 65/4084* (2013.01); *H04L 65/607* (2013.01); *H04L 65/608* (2013.01); *H04L 67/02* (2013.01); *H04N 21/26283* (2013.01); *H04N 21/462* (2013.01); *H04N 21/482* (2013.01); *H04N 21/84* (2013.01)

(58) Field of Classification Search
  CPC ..... H04L 65/607; H04L 65/608; H04L 67/02; H04L 65/4084; H04L 63/0428
  See application file for complete search history.

(56) References Cited

U.S. PATENT DOCUMENTS

| 8,184,952 B2 | 5/2012 | Sandoval |
| 2002/0199096 A1 | 12/2002 | Wenocur et al. |

(Continued)

FOREIGN PATENT DOCUMENTS

WO   2012021543 A1   2/2012

OTHER PUBLICATIONS

"Information technology—Dynamic adaptive streaming over HTTP (DASH)-: Part 1 Media presentation description and segment formats," International Standard, ISO/IEC 23009-1, Apr. 1, 2012, 134 pages.

(Continued)

*Primary Examiner* — Izunna Okeke
(74) *Attorney, Agent, or Firm* — Slater & Matsil, L.L.P.

(57) ABSTRACT

System and method embodiments are provided for asynchronous event notification and message handling in dynamic adaptive streaming over hypertext transfer protocol (DASH). The embodiments includes sending in a segment file, from a network server to a client, a message box that is configurable for encryption, for scheduling a callback from the client, and with one or more arguments according to a messaging scheme of the message box. The network server further sends a message handling descriptor to the client for reloading a media presentation description (MPD) for obtaining a DASH event. The client then configures a universal resource locator (URL) for the MPD using the message box and the message handling descriptor, and sends the URL back to the network server. After receiving the URL, the network server sends the MPD to the client, which then uses the MPD to request segments of an asynchronous event.

31 Claims, 3 Drawing Sheets

(51) Int. Cl.
*H04L 9/32* (2006.01)
*H04L 29/08* (2006.01)
*H04N 21/262* (2011.01)
*H04N 21/462* (2011.01)
*H04N 21/482* (2011.01)
*H04N 21/84* (2011.01)

(56) References Cited

U.S. PATENT DOCUMENTS

| | | | |
|---|---|---|---|
| 2007/0124359 | A1 | 5/2007 | Hwang et al. |
| 2011/0083009 | A1 | 4/2011 | Shamoon et al. |
| 2011/0231519 | A1 | 9/2011 | Luby et al. |
| 2011/0280216 | A1 | 11/2011 | Li et al. |
| 2012/0020413 | A1 | 1/2012 | Chen et al. |
| 2012/0023254 | A1 | 1/2012 | Park et al. |
| 2012/0114118 | A1* | 5/2012 | Verma .............................. 380/42 |

OTHER PUBLICATIONS

"Information technolg—MPEG systems technologies—Part 7: Common encryption in ISO base media file format files," ISO/IEC JTC 1/SC 29, International Standard, Jul. 22, 2011, 15 pages.

"Series X: Data Networks and Open System Communications," International Telecommunication Union, ITU-T Recommendation X.667, Sep. 2004, 34 pages.

"Information technology—Coding of audio-visual objects—Part 12: ISO base media file format," ISO/IEC 14496-12, International Standard, 2012, 196 pages.

"Digital Program Insertion Cueing Message for Cable," American National Standard, Society of Cable Telecommunications Engineers, ANSI/SCTE 35, 2012, 44 pages.

"Notification of Transmittal of the International Search Report and the Written Opinion of the International Searching Authority, or the Declaration," International Application No. PCT/US13/35516, Applicant: Huawei Technologies Co., Ltd., mailing date: Aug. 2, 2013, 9 pages.

Extended European Search Report received in Application No. 13773120.4-1853, mailed Jan. 20, 2015, 8 pages.

Qualcomm Incorporated, "Support of Push Updates in DASH," 3GPP TSG-SA4 #61, S4-100800, Barcelona, Spain, Nov. 8-12, 2010, 4 pages.

Telefon AB LM Ericsson et al., "Media Presentation Description in HTTP Streaming," 3GPP SA 4#57, S4-100080, St. Julian, Malta, Jan. 25-29, 2010, 12 pages.

* cited by examiner

SYSTEM AND METHOD FOR SECURE ASYNCHRONOUS EVENT NOTIFICATION FOR ADAPTIVE STREAMING BASED ON ISO BASE MEDIA FILE FORMAT

This application claims the benefit of U.S. Provisional Application No. 61/620,810 filed on Apr. 5, 2012 by Alexander Giladi and entitled "System and Method for Secure Asynchronous Event Notification for Adaptive Streaming," which is hereby incorporated herein by reference as if reproduced in its entirety.

TECHNICAL FIELD

The present invention relates to the field of media streaming, and, in particular embodiments, to a system and method for secure asynchronous event notification for adaptive streaming based on Organization for Standardization (ISO) base media file format.

BACKGROUND

Unscheduled or unexpected events, referred to herein as asynchronous events, can occur in cases of media streaming or downloading, e.g., over the Internet or other Internet Protocol (IP) based networks. Asynchronous events may occur during live broadcast or live streaming or during video on demand (VoD) content downloading. Asynchronous events are used for digital program insertion such as for advertisement and can also be used for applications such as emergency messaging and blackout management. Targeted advertisement is a revenue source in the current entertainment ecosystem, both on the Internet and in the Cable/IP television (IPTV) environment. In the Cable/IPTV environment, targeted advertisement insertion is standardized via SCTE-35 (via mark-up) and SCTE-30/130 (via advertisement server interaction), and is available from multiple vendors.

Schedule changes may occur in live events. For example, during the 2011 Canadian Grand Prix of Formula One racing, a heavy rainstorm hit the racing circuit and the race was stopped at about 30 minutes from start and then restarted after more than two hours. Such situations trigger schedule changes by broadcasters, for example to insert advertisement or other asynchronous events. The broadcasters may run alternative programming (e.g., advertisement) during the unexpected delay or after cancellation of the main broadcast event. In another example, if a soccer or hockey game score is a tie, the game goes into overtime. Overtime may last anywhere between minutes and hours (with several breaks) and scheduled content may be delayed or canceled. There is a need for an efficient adaptive streaming scheme to handle asynchronous events in such situations, such as to insert advertisement, emergency messaging, or blackout alerts.

SUMMARY OF THE INVENTION

In accordance with an embodiment, a method for event notification in dynamic adaptive streaming over hypertext transfer protocol (DASH) includes sending in a segment file, from a network server to a client, a message box that is configurable for encryption, for scheduling a callback from the client, and with one or more arguments according to a messaging scheme of the message box. The method further includes sending a message handling descriptor to the client for reloading a media presentation description (MPD) for obtaining a DASH event, receiving from the client a universal resource locator (URL) for the MPD, wherein the URL is configured using the message box and the message handling descriptor, and sending the MPD to the client.

In accordance with another embodiment, a method for event notification in DASH includes receiving at a client terminal, in a segment file from a network component, a message box that is configurable for encryption, scheduling a callback from the client, and with one or more arguments according to a messaging scheme of the message box. The method further includes receiving a message handling descriptor for reloading a MPD for obtaining a DASH event, configuring a URL for the MPD using the message box and the message handling descriptor, sending the URL for the MPD, and receiving the MPD for the DASH event.

In accordance with another embodiment, a network component supporting event notification in DASH includes a processor and a computer readable storage medium storing programming for execution by the processor. The programming includes instructions to send in a segment file to a client a message box that is configurable for encryption, for scheduling a callback from the client, and with one or more arguments according to a messaging scheme of the message box, send a message handling descriptor to the client for reloading a MPD for obtaining a DASH event, receive from the client a URL for the MPD, wherein the URL is configured using the message box and the message handling descriptor, and send the MPD to the client.

In accordance with yet another embodiment, a user device supporting event notification in DASH includes a processor and a computer readable storage medium storing programming for execution by the processor. The programming includes instructions to receive in a segment file, from a network component, a message box that is configurable for encryption, scheduling a callback from the user device, and with one or more arguments according to a messaging scheme of the message box, receive a message handling descriptor for reloading a MPD for obtaining a DASH event, configure a URL for the MPD using the message box and the message handling descriptor, send the URL for the MPD, and receive the MPD for the DASH event.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Dynamic Adaptive Streaming over Hypertext Transfer Protocol (DASH), also known as MPEG-DASH, is developed to enable high quality streaming of media content over the Internet delivered from conventional Hypertext Transfer Protocol (HTTP) web servers.

Figure 1:
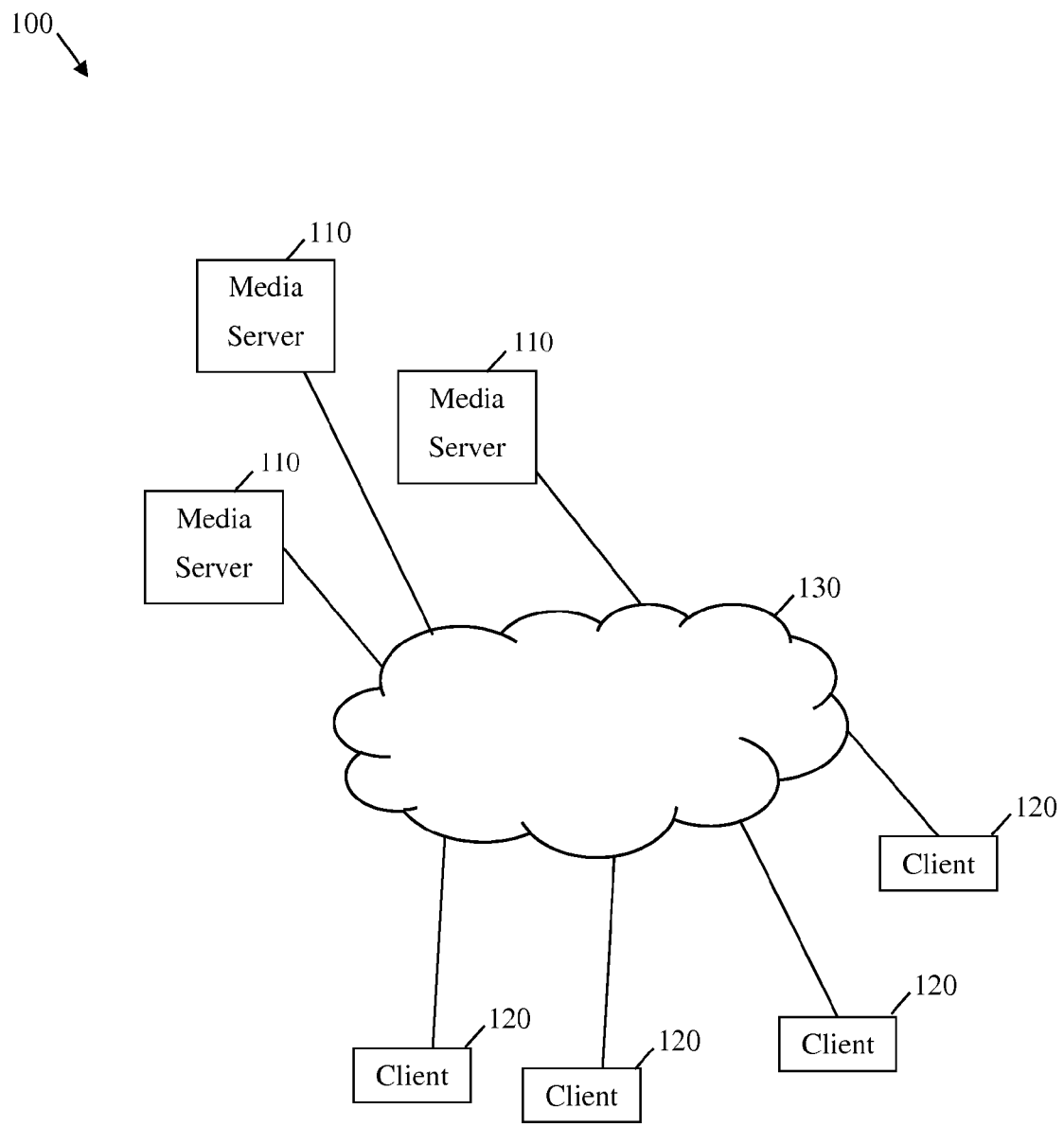
FIG. 1 is an example of a DASH architecture.

FIG. 1 shows an example of a DASH architecture 100 for streaming media (e.g., video, music, games, applications, etc.) to clients (e.g., subscribers or general users). The media can include live broadcast events or programs, on demand content or video, or both. Additionally, the media can include asynchronous events, such as advertisements, emergency messaging, blackout alerts, or other events.

The DASH architecture 100 includes one or more media servers 110 that provide media content, such us in the form of segment files according to Organization for Standardization (ISO) Base Media File Format (BMFF). The DASH architecture 100 includes one or more clients 120 that comprise user equipment or devices, such as set-top boxes (STBs), desktop computers, laptop computers, tablet computers, smartphones, or any other type of mobile/personal devices. The clients 120 are configured to receive, according to DASH, the media content from the servers 110 over any access network 130, e.g., the Internet, a wireless local area network (WLAN), a WiFi network or hotspot, a cellular network, a cable infrastructure, a fiber optic backbone or access network, or combinations thereof. To receive content using HTTP, the clients 120 need to first request the content.

In the DASH architecture 100, the original content in the server 110 can be encoded into media streams (e.g., video streams) at different rates. A video or other media content can be segmented into a plurality of segments that can be streamed individually and independently from the server 110 to a client 120 over the access network 130. The servers 110 also provide media presentation description (MPD) corresponding to video/media files, e.g., for each group of segment files of a video or program. The servers 110 also provide universal resource locators (URLs) for the MPD files to indicate the location of the MPD files in the servers 110 or network 130.

The MPD is sent from the server 110 to the client 120 and describes a manifest (e.g., a list) of the available content (e.g., content segments), its various alternatives, URL addresses (e.g., of content segments), and other characteristics. The MPD is obtained by the DASH client 120 to play content. The MPD can be delivered from a content server 110 to the client 120 using HTTP. By parsing the MPD, the client 120 learns about the content (e.g., a program) timing, content or media availability, media types, resolutions, minimum and maximum bandwidths, the existence of various encoded alternatives of multimedia components, accessibility features and required digital rights management (DRM), media-component locations on the network, and other content characteristics. The media content, e.g., on demand video or a broadcast program, is divided into a plurality of addressed segments that can be forwarded separately, each representing a chunk or portion of the content and has a corresponding URL and duration indicated in the MPD.

Using the information in the MPD, the client 120 selects the appropriate encoded alternative and starts streaming the content by fetching the segments of content using HTTP GET requests. For example, the information includes the locations of the files/segments in the servers 110 and/or network 130. From the MPD information, the client 120 can also determine the video rate based on network conditions for the client 120 (e.g., determine which segments files to get that match a suitable download rate).

Further, the client 120 can get the MPD file periodically or when needed to adjust the media download or streaming rate. To implement asynchronous events, the manifest in the MPD is reloaded to the client 120. Content reloading can be provided by server-side event handling (e.g., a server 110 inserts an advertisement) and by using segment URLs on the client side to get the inserted event. DASH provides the MPD location URL and update frequency, which together can be used for reloading the manifest by polling (from the client-side). However, the DASH approach to reload the MPD location URL introduces unwanted delay or undesired frequent reload attempts. The DASH defines an ISO file formatlabel, "lseg", which when present within a "styp" box in a segment file, identifies the last segment of a period of the MPD. The "styp" box may be a code (e.g., syntax) in a segment file that is sent from a server 110 to a client 120. The MPD comprises a plurality of periods, where a period is a program or content interval along the time axis. Each period has a starting time and duration. For example, an advertisement segment or multiple advertisement segments can be inserted as a period or more. When detected, the period effectively ends, and a next period can start. If there are no additional periods, then a MPD reload or update is triggered.

This DASH approach, while sufficient for several purposes, suffers from multiple issues. One issue is that since the MPD URL does not change, MPDs are fetched always from the same URL (same location). Further, any event designated by "lseg" is immediate, meaning it has two-second segments and an expected schedule change. For such event, clients have up to two seconds to update the MPD in order to be able to tune into the announcement. This creates a flood of requests (due to such high frequency), which could cause delays or network congestion. Another issue is that there may be more than one type of possible events (e.g., advertisement, schedule change, blackout, emergency alert, or others). Handling events that are known ahead of time, such as advertisements and emergency messaging, may need extra MPD reloads. Another issue is that in case of personalized content, a client-specific MPD limits scalability. Further, the DASH approach above does not allow streaming or downloading multiple events at the same time for a client 120.

A DASH-based DECE CSF proposal by Microsoft™ addresses some of these issues above by adding a message box, 'mesg', to the segment file (e.g., at the beginning of the segment). The 'mesg' box has a unique message scheme (or structure) and message identification. Interpreting the 'mesg' box at the client can trigger the client to realize that the MPD is outdated and hence reload or update the MPD using a new URL. The proposal also adds an extra scheme that forces a MPD reload and also provides an optional new MPD URL. However, this proposal also suffers from several issues. First, the box leaves message timing and handling undefined such that a client cannot handle a message unless the client knows the message scheme. This creates a possibility of clients that are able to play the content but, for example, are unable to display an emergency message with the content. A second issue is that it is difficult to distinguish between events inserted by different entities. Further, in this approach, the MPD URL update message allows a simple attack by replacing a valid URL with a malicious one.

System and method embodiments are provided for adaptive streaming using DASH. The embodiments provide an asynchronous event handling framework in adaptive streaming. The embodiments include extending the syntax of the message box, 'mesg', by adding uniform encryption, scheduling, and argument interface. An additional MPD functionality is added that allows implementation of rich representational state transfer (REST) application programming interfaces (APIs) without explicit client knowledge of message types and schemes. This means, that the client can use the information in the 'mesg' box to configure a URL that can be interpreted on the server-side as an operation. Extending the message box and adding this MPD functionality enable generic asynchronous stream event handling with DASH MPD and ISO BMFF. ISO BMFF currently does not have such functionality. These features also add security and protection from common attacks to the event handling mechanism and the functionality for forcing change of content played by the DASH client. The added functionalities can be used to implement advertisement insertion, targeted advertisement, emergency messaging, blackout handling, and/or other events, e.g., in cable/IPTV/telecommunication systems, content delivery networks (CDNs), DASH systems, or other suitable systems.

In an embodiment, a generic event notification message structure is configured by extending the ISO file format for the message box as follows:

```
Box Type:       'mesg'
Container:      'tfdt'
Mandatory:      No
Quantity:       Zero or more
Syntax
aligned(8) class MessageBox
        extends FullBox('mesg', version = 0, flags = 0)
{
        string  message_scheme_URI;
        unsigned int(16) message_scheme_version;
    unsigned int(1)    is_encrypted;
    unsigned int(1)    is_cancelled;
    unsigned int(3)    schedule;
    unsigned int(11)   reserved;
    if ( is_encrypted == 0x01 )
    {
        unsigned int(24)        IsEncrypted;
            unsigned int(8)     IV_size;
            unsigned int(8)[16] KID;
            unsigned int(8)     IV[IV_size];
        unsigned int(8)[16]     md5sum;
    }
    unsigned int(8)[16] message_id;
    // encryption may start here
    if ( schedule != 0x00 )
    {
        unsigned int(64) ntp_time;
    }
    unsigned int(8)  argc;
    string argv[argc];
}
```

The extended 'mesg' box above includes the following parameters or fields:
message_scheme_URI: this is a unique identifier of a messaging scheme or structure for the message box. This identifier is used to find the correct message handler for the message box as described below;
message_scheme_version: this field or parameter is the version of the above scheme; is_encrypted: if this field is set to 1, then the message information is encrypted, starting from the message_id field;
is_cancelled: this field indicates that message callback (form client to server/network) with a given message identifier (message_id) is cancelled. The callback message information is discarded if there is no active message with message_id. A callback message is considered active until the callback is completed;
schedule: this field indicates scheduling information that is configurable as shown in Table 1 below;
message_id: this is a unique identifier of a given message box;
IsEncrypted: this field indicates an encryption state, e.g., as defined in ISO/IEC 23001-7;
IV_size: this field is the initialization vector size, e.g., as defined in ISO/IEC 23001-7;
KID: this is an identifier of a key used for encryption of the message box;
InitializationVector[IV_size]: this is an initialization vector;
md5sum: this field indicates a MD5 sum of the encrypted message. It may be needed in order to ensure the correctness of a decrypted message; and ntp_time: this indicates a callback timing for the scheduled message callback and is used according to the schedule field, as shown in Table 1.

TABLE 1

| schedule field | callback information |
|---|---|
| 0 | Callback is immediate |
| 1 | Callback is scheduled to be completed before a given absolute time t = ntp_time. |
| 2 | Calback is scheduled before a given relative time (e.g., if the current time is $T_{msg}$, and ntp_time is t, the callback should be performed before $T_{msg}$ + t |
| 3-7 | Undefined | argc: this is the number of arguments.
argv: this field includes arguments added to the message box, which may be scheme-specific.

Additionally, a MessageHandler element is configured and used for handling the 'mesg' box above properly at the client. Handling the 'mesg' box includes decrypting and encrypted 'mesg' box and optionally indicating specific message scheme information that are not provided in the 'mesg' box. The MessageHandler element includes a plurality of attributes and is sent (in a descriptor, as shown below) from the client/network to the client and processed by the client with the 'mesg' box to generate a suitable MPD URL (according to the event). There can be more than one message handling descriptor comprising a MessageHandler element and sent from server to client. The correct descriptor for a received 'mesg' box at the client is found by matching a value of a @schemeIdUri attribute of the MessageHandler with the value of the message_scheme_URI field in the 'mesg' box. Table 2 shows attributes that are used in the MessageHandler element.

TABLE 2

| Element or Attribute Name | Use | Description |
|---|---|---|
| MessageHandler | | |
| @schemeIdUri | M | Identifies the messaging scheme. |
| @schemeVersion | O | Identifies the version of the scheme. Absence of @schemeVersion attribute indicates that all versions are accepted. |
| @messageCallbackUrTemplate | O | Specifies a template for a callback URL. |
| @messageKeyUrlTemplate | O | Specifies a template for URL used to retrieve the key. The key format is a hexadecimal number. |
| @value | O | Scheme-specific information. |

Legend of Table 2:
For attributes: M = Mandatory, O = Optional, OD = Optional with Default Value, CM = Conditionally Mandatory.
For elements: <minOccurs> . . . <maxOccurs> (N = unbounded)
Elements are bold; attributes are non-bold and preceded with an @

The @messageCallbackUrTemplate attribute of the MessageHandler may be based (in the message handling descriptor) on at least one of the template variables $MessageID$, $KeyID$, and $Argv[N]$, which can be used by the client for configuring A MPD URL to reload or update the MPD at the client. The template variables can be assigned values (at the client) from the fields in the 'mesg' box, as described in Table 3.

TABLE 3

| $<Identifier>$ | Substitution parameter | Format |
| --- | --- | --- |
| $MessageID$ | This identifier is substituted by the Message ID as specified in the 'mesg' box. The format is a canonical UUID, as specified in ITU-T Rec. X.667 | ISO/IEC 9834-8. | The format tag may be present. If no format tag is present, a default format tag with width = 1 is used. |
| $Argv[N]$ | This identifier is substituted with the escaped content of the $N^{th}$ arg field of the 'mesg' box. If N is outside the range of [0 ... mesg.argc], the value of $Argv[N]$ is an empty string. | The format tag may not be present. |
| $KeyID$ | This identifier is substituted by the Key ID as specified in the 'mesg' box. The format is a canonical UUID, as specified in ITU-T Rec. X.667 | ISO/IEC 9834-8. The value of $KeyID$ is assumed to be an empty string if mesg.is_encrypted = 0. | The format tag may not be present. |

In an embodiment, to force change of content played by the DASH client, MPD update or reload is used as defined by the server or network to the client in a MessageHandler element or descriptor (e.g., in a message) with the following uniform resource name (URN): "urn:mpeg:dash:mpdupdate". The corresponding MessageHandler element (for handling the 'mesg' box) includes the @messageCallbackUrTemplate attribute but not the @value attribute. A HTTP GET request for a URL constructed from the messageCallbackUrTemplate attribute returns a valid MPD. Similar rules as in ISO/IEC 23009-1 sec. 5.4 apply to MPD update via this URL.

For instance, to establish a forced MPD update, the content of the 'mesg' box includes:

```
mesg.message_scheme_URI = "urn:mpeg:dash:mpdupdate"
mesg.message_scheme_version = 0;
mesg.is_encrypted = 0;
mesg.is_signed = 0;
mesg.schedule = 0;
```

The content of the corresponding descriptor that indicates the MessageHandler to client includes:
<MessageHandler schemeIdUri="urn:mpeg:dash:mpdupdate" messageCallbackUrTemplate=https://cdn1.example.com/mpd/$MessageID$/>. The client uses the indicated template to generate a MPD URL after assigning to the template variable a value from the 'mesg' box. The generated MPD URL is used to fetch the MPD. For example, the resulting URL is https://cdn1.example.com/mpd/184834bc76a04825bb57d6bc0e1d35d3.

In an embodiment, the arguments in the 'mesg' box can be mapped to a SCTE-35 segmentation descriptor as follows:

```
mesg.arg[0] = <segmentation descriptor id>
mesg.arg[1] = segmentation_event_id;
mesg.arg[2] = segmentation_type_id;
mesg.arg[3] = segment_num;
mesg.arg[4] = segments_expected;
mesg.arg[5] = segmentation_upid_type, segmentation_upid( );
mesg.arg[6] = segmentation_duration; (if not present)
```

In another embodiment, a simpler (and maybe less efficient) mapping between the arguments in the 'mesg' box and a message descriptor can be established as follows:

```
mesg.arg[0]
="https://cdn1.example.com/mpd/segmentation?event_id=0x12345678&type_id=0x10& [...],
``` where the @messageCallbackUrlTemplate includes the variable "$Arg[0]$". In such a case, message encryption is recommended in order to prevent attacks (e.g., man-in-the-middle attacks) that can result in maliciously constructed URLs or HTTP queries.

Figure 2:
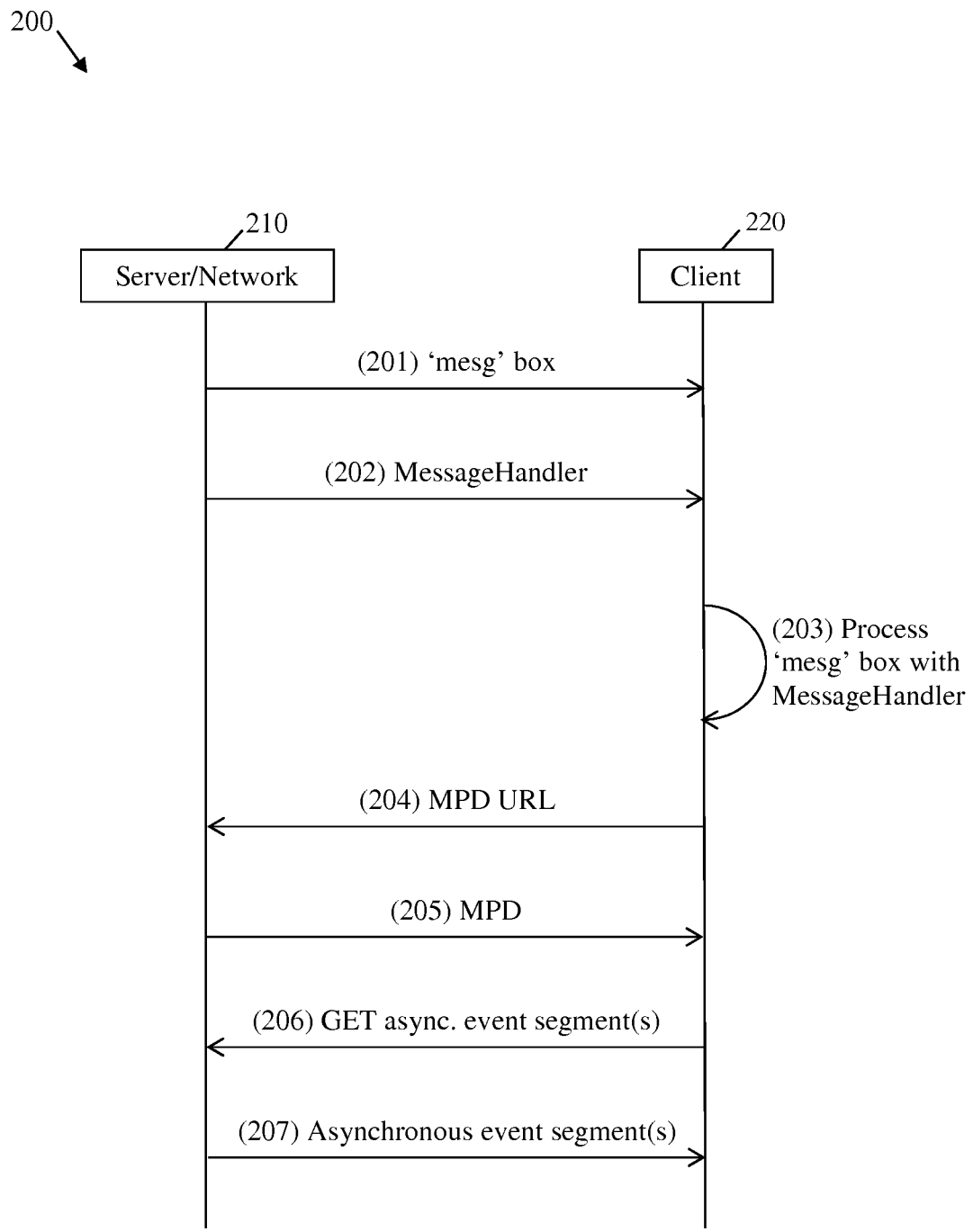
FIG. 2 is a flow diagram for an embodiment method for secure asynchronous event notification for adaptive streaming using DASH.

FIG. 2 shows an embodiment method 200 for secure asynchronous event notification for adaptive streaming using DASH. At step 201, a server or network 210 sends an extended 'mesg' box to a client 220. The extended 'mesg' box can be encrypted and includes the fields including one or more arguments as described above. At step 202, the server or network 210 sends a descriptor with a MessageHandler element to the client 220. The MessageHandler element can trigger the client 220 for a reload MPD and indicates the variables for configuring the MPD URL, as described above. The server/network 210 can send a plurality of MessageHandler elements, e.g., for different messaging schemes. At step 203, the client 220 processes the 'mesg' box using the attributes and variables (as in Tables 2 and 3) indicated in the message handler descriptor to configure the MPD URL properly. The client 220 matches the MessageHandler element to the 'mesg' box using the @ schemeIdUri in the MessageHandler element and the message_scheme_URI field in the 'mesg' box. At step 204, the client 220 requests from the server or network the new MPD (for the asynchronous event) using the MPD URL. At step 205, the client 220 receives the MPD for the asynchronous event. At step 206, the client requests the segments as indicated in the MPD (e.g., using the URLs and other timing and rate information in the MPD). At step 207, the client 220 receives the asynchronous event segments.

Figure 3:
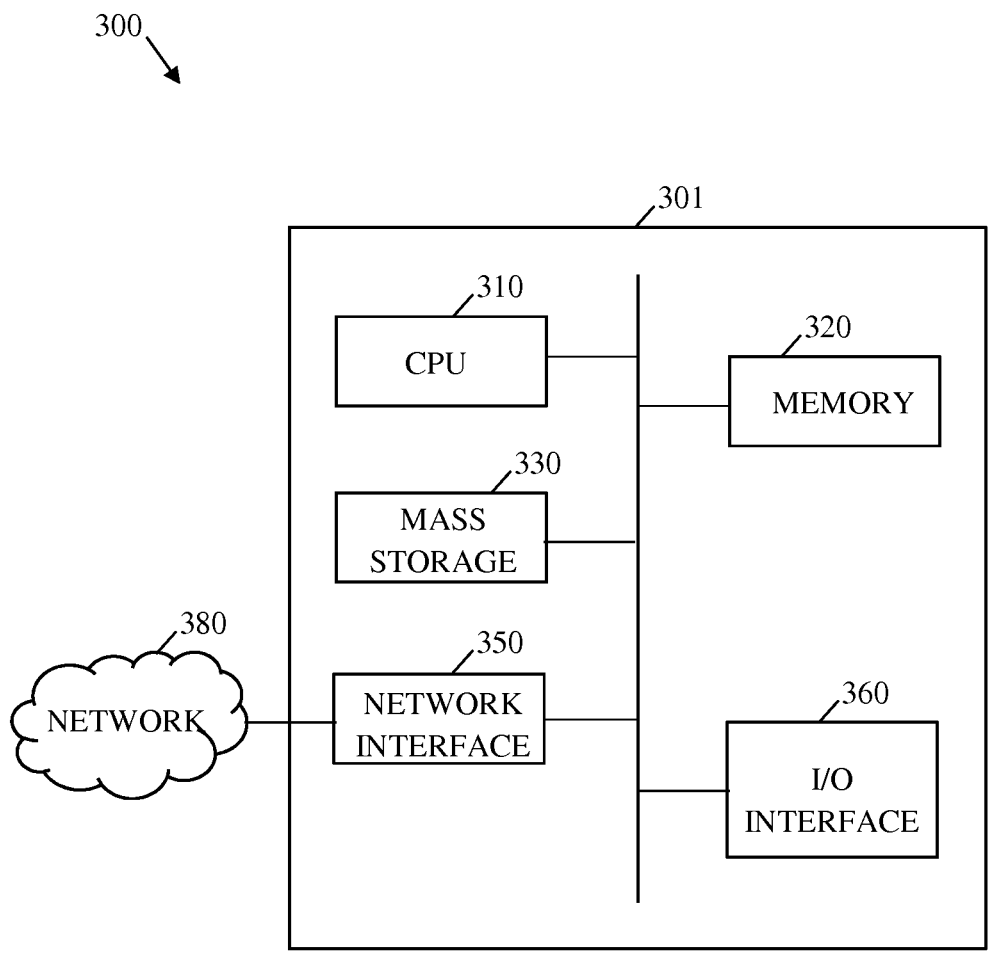
FIG. 3 is a diagram of a processing system that can be used to implement various embodiments.

FIG. 3 is a block diagram of a processing system 300 that can be used to implement various embodiments. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 300 may comprise a processing unit 301 equipped with one or more input/output devices, such as a network interfaces, storage interfaces, and the like. The processing unit 301 may include a central processing unit (CPU) 310, a memory 320, a mass storage device 330, and an I/O interface 360 connected to a bus. The bus may be one or more of any type of several bus architectures including a memory bus or memory controller, a peripheral bus or the like.

The CPU 310 may comprise any type of electronic data processor. The memory 320 may comprise any type of system memory such as static random access memory (SRAM), dynamic random access memory (DRAM), synchronous DRAM (SDRAM), read-only memory (ROM), a combination thereof, or the like. In an embodiment, the memory 320 may include ROM for use at boot-up, and DRAM for program and data storage for use while executing programs. In embodiments, the memory 320 is non-transitory. The mass storage device 330 may comprise any type of storage device configured to store data, programs, and other information and to make the data, programs, and other information accessible via the bus. The mass storage device 330 may comprise, for example, one or more of a solid state drive, hard disk drive, a magnetic disk drive, an optical disk drive, or the like.

The processing unit 301 also includes one or more network interfaces 350, which may comprise wired links, such as an Ethernet cable or the like, and/or wireless links to access nodes or one or more networks 380. The network interface 350 allows the processing unit 301 to communicate with remote units via the networks 380. For example, the network interface 350 may provide wireless communication via one or more transmitters/transmit antennas and one or more receivers/receive antennas. In an embodiment, the processing unit 301 is coupled to a local-area network or a wide-area network for data processing and communications with remote devices, such as other processing units, the Internet, remote storage facilities, or the like.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for event notification in dynamic adaptive streaming over hypertext transfer protocol (DASH), the method comprising:
    sending in a segment file, from a network server to a client, a message box that is configurable for scheduling a callback from the client via a callback universal resource locator (URL) constructed according to a message handling descriptor;
    sending the message handling descriptor to the client for reloading a media presentation description (MPD) for obtaining a DASH event, wherein the message handling descriptor comprises a message handler element including one or more attributes comprising a first attribute that identifies a messaging scheme, a second attribute that indicates a template for a callback URL from the client, and a third attribute that indicates scheme-specific information;
    receiving from the client a URL for the MPD, wherein the URL is configured from the message box using the message handling descriptor; and
    sending the MPD to the client.

2. The method of claim 1, wherein the message box comprises a combination of one or more fields including an is_encrypted field that is set to indicate that the message box is encrypted starting from a message_id field, the message_id field that identifies the message box, an IsEncrypted field that indicates an encryption state of the message box, an IV_size field that indicates a size of an initialization vector, a KID field that identifies a key used for encryption, an InitializationVector[IV_size] field that indicates the initialization vector, a md5sum field that indicates a MD5 sum of the message box when encrypted, a ntp_time field that indicates timing information for a scheduled callback, an argc field that indicates a number of the arguments in the message box, and an argv field that includes the arguments.

3. The method of claim 2, wherein the combination of fields further includes a message_scheme_URI field that identifies the messaging scheme of the message box, a message_scheme_version field that indicates a version of the messaging scheme, an is_cancelled field that is set to indicate that callback for a given identifier (ID) is cancelled, and a schedule field that indicates scheduling information.

4. The method of claim 3, wherein the schedule field is set to 0 to indicate immediate callback from the client to the network server, set to 1 to indicate that callback from the client is scheduled to be completed before a given time indicated in the ntp_time field, or set to 2 to indicate that callback from the client is scheduled before a given time equals to a sum of the time indicated in the ntp_time field and a current time of the message box.

5. The method of claim 3, wherein the ntp_time field is added to the message box if the schedule field is not equal to 0.

6. The method of claim 2, wherein the IsEncrypted field, the IV_size field, the KID field, the InitializationVector[IV_size] field, and the md5sum field are added to the message box if the is_encrypted field indicates that the message box is encrypted.

7. The method of claim 1, wherein the one or more attributes further include a fourth attribute that identifies a version of the messaging scheme, and a fifth attribute that indicates a template for a URL to retrieve a key used for encrypting the message box.

8. The method of claim 7, wherein absence of the fourth attribute in the message handler element indicates that any version of the messaging scheme is accepted.

9. The method of claim 1, wherein the message handling descriptor includes a pre-determined uniform resource name (URN) that is known to the client to trigger the reloading of the MPD by the client.

10. The method of claim 1, wherein the MPD is for an asynchronous event, and wherein the asynchronous event is an advertisement event, an emergency notification, a blackout alert, or a targeted advertisement.

11. The method of claim 1 further comprising sending to the client one or more segments of the DASH event that have an Organization for Standardization (ISO) Base Media File Format (BMFF).

12. The method of claim 1, wherein the one or more arguments are mapped to a SCTE-35 segmentation descriptor.

13. The method of claim 1, wherein the one or more arguments are mapped to a URL that triggers an operation or function.

14. A method for event notification in dynamic adaptive streaming over hypertext transfer protocol (DASH), the method comprising:
    receiving at a client terminal, in a segment file from a network component, a message box that is configurable for scheduling a callback from the client terminal via a callback universal resource locator (URL) constructed according to a message handling descriptor;
    receiving the message handling descriptor for reloading a media presentation description (MPD) for obtaining a DASH event, wherein the message handling descriptor comprises a message handler element including one or more attributes comprising a first attribute that identifies a messaging scheme, a second attribute that indicates a template for a callback URL from the client, and a third attribute that indicates scheme-specific information;
    configuring a URL for the MPD from the message box using the message handling descriptor;
    sending the URL for the MPD; and
    receiving the MPD for the DASH event.

15. The method of claim 14 further comprising receiving one or more segments of an asynchronous event corresponding to the MPD, wherein the asynchronous event is an advertisement event, an emergency notification, a blackout alert, or a targeted advertisement.

16. The method of claim 14 further comprising matching the message handling descriptor to the message box by matching a @schemeIdUri attribute of the message handler element in the message handling descriptor to a message_scheme_URI field in the message box.

17. The method of claim 16 further comprising receiving at least one other message handling descriptor that includes a different @schemeIdUri attribute than the message_scheme_URI field, wherein the other message handling descriptor is not matched to the message box.

18. The method of claim 16 further comprising using in the URL a callback URL template of the message handler element indicated in the message handling descriptor for configuring the URL to reload the MPD, wherein the callback URL template is based on a combination of one or more variables including a $MessageID$ variable, a $KeyID$ variable, and a $Argv[N]$ variable.

19. The method of claim 18 further comprising:
replacing the $MessageID$ variable if present in the callback URL template with a value of a message_id field in the received message box; and
sending the value in the URL.

20. The method of claim 18 further comprising:
replacing the $KeyID$ variable if present in the callback URL template with a value of a KID field in the received message box; and
sending the value in the URL.

21. The method of claim 16 further comprising:
replacing the $Argv[N]$ variable if present in the callback URL template with a value of a N-th argument from a string of arguments in the received message box, where N is an integer; and
sending the value in the URL.

22. A network component supporting event notification in dynamic adaptive streaming over hypertext transfer protocol (DASH), the network component comprising:
a processor; and
a computer readable storage medium storing programming for execution by the processor, the programming including instructions to:
send in a segment file to a client a message box that is configurable for scheduling a callback from the client via a callback universal resource locator (URL) constructed according to a message handling descriptor;
send the message handling descriptor to the client for reloading a media presentation description (MPD) for obtaining a DASH event, wherein the message handling descriptor comprises a message handler element including one or more attributes comprising a first attribute that identifies a messaging scheme, a second attribute that indicates a template for a callback URL from the client, and a third attribute that indicates scheme-specific information;
receive from the client a URL for the MPD, wherein the URL is configured from the message box using the message handling descriptor; and
send the MPD to the client.

23. The network component of claim 22, wherein the message box comprises a combination of one or more fields including an is_encrypted field that is set to indicate that the message box is encrypted starting from a message_id field, the message_id field that identifies the message box, an IsEncrypted field that indicates an encryption state of the message box, an IV_size field that indicates a size of an initialization vector, a KID field that identifies a key used for encryption, an InitializationVector[IV_size] field that indicates the initialization vector, a md5sum field that indicates a MD5 sum of the message box when encrypted, a ntp_time field that indicates timing information for a scheduled callback, an argc field that indicates a number of arguments in the message box, and an argv field that includes the arguments.

24. The network component of claim 23, wherein the combination of fields further includes a message_scheme_URI field that identifies the messaging scheme of the message box, a message_scheme_version field that indicates a version of the messaging scheme, an is_cancelled field that is set to indicate that callback for a given identifier (ID) is cancelled, and a schedule field that indicates scheduling information.

25. The network component of claim 22, wherein the one or more attributes further include a fourth attribute that identifies a version of the messaging scheme and a fifth attribute that indicates a template for a URL to retrieve a key used for encrypting the message box.

26. The network component of claim 22, wherein the message handling descriptor includes a pre-determined uniform resource name (URN) that is known to the client to trigger the reloading of the MPD by the client.

27. A user device supporting event notification in dynamic adaptive streaming over hypertext transfer protocol (DASH), the user device comprising:
a processor; and
a computer readable storage medium storing programming for execution by the processor, the programming including instructions to:
receive in a segment file, from a network component, a message box that is configurable for scheduling a callback from the user device via a callback universal resource locator (URL) constructed according to a message handling descriptor;
receive the message handling descriptor for reloading a media presentation description (MPD) for obtaining a DASH event, wherein the message handling descriptor comprises a message handler element including one or more attributes comprising a first attribute that identifies a messaging scheme, a second attribute that indicates a template for a callback URL from the client, and a third attribute that indicates scheme-specific information;
configure a URL for the MPD from the message box using the message handling descriptor;
send the URL for the MPD; and
receive the MPD for the DASH event.

28. The user device of claim 27, wherein the message box comprises a combination of one or more fields including an is_encrypted field that is set to indicate that the message box is encrypted starting from a message_id field, the message_id field that identifies the message box, an IsEncrypted field that indicates an encryption state of the message box, an IV_size field that indicates a size of an initialization vector, a KID field that identifies a key used for encryption, an InitializationVector[IV_size] field that indicates the initialization vector, a md5sum field that indicates a MD5 sum of the message box when encrypted, a ntp_time field that indicates timing information for a scheduled callback, an argc field that indicates a number of arguments in the message box, and an argv field that includes the arguments.

29. The user device of claim 28, wherein the combination of fields further includes a message_scheme_URI field that identifies the messaging scheme of the message box, a message_scheme_version field that indicates a version of the messaging scheme, an is_cancelled field that is set to indicate that callback for a given identifier (ID) is cancelled, and a schedule field that indicates scheduling information.

30. The user device of claim 27, wherein the one or more attributes further include a fourth attribute that identifies a version of the messaging scheme, and a fifth attribute that indicates a template for a URL to retrieve a key used for encrypting the message box.

31. The user device of claim 27, wherein the message handling descriptor includes a pre-determined uniform resource name (URN) that is known to the client to trigger the reloading of the MPD by the client.

\* \* \* \* \*